March 30, 1937.  L. G. SCUTT  2,075,474
ELECTRICAL COOKING AND TOASTING DEVICE
Filed March 11, 1933   2 Sheets-Sheet 1
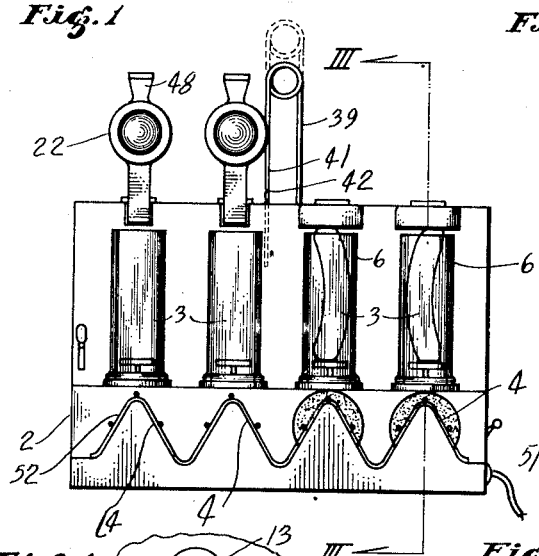
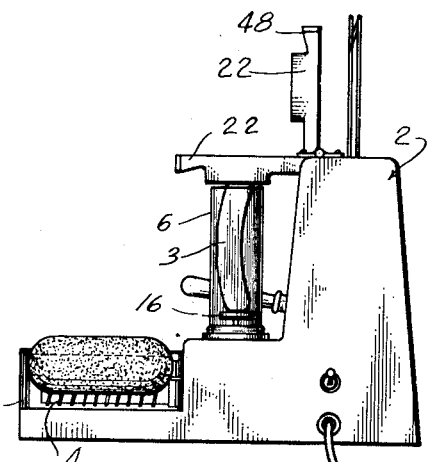
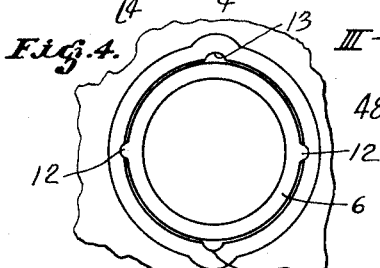
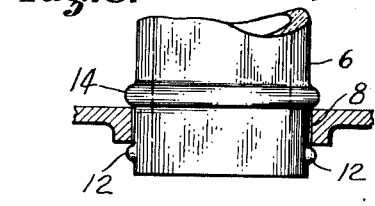
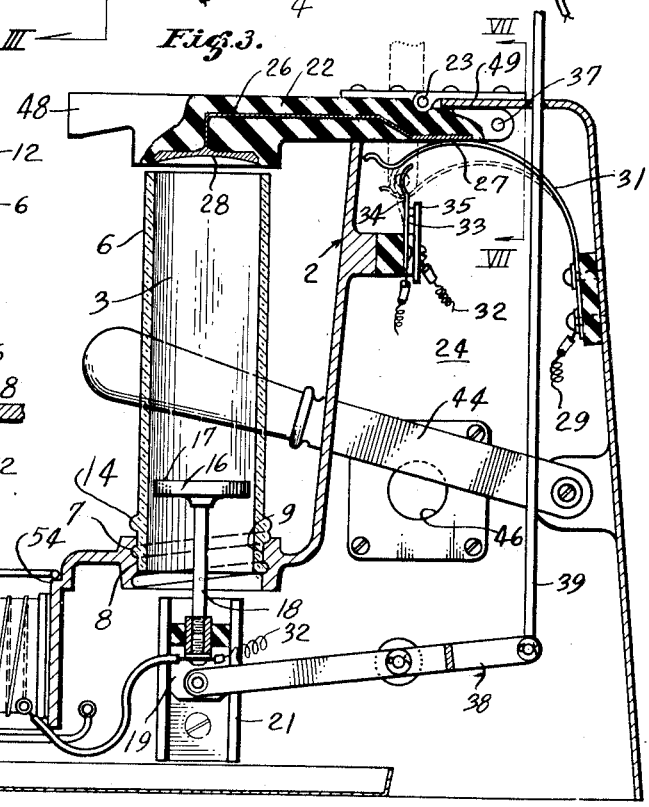
INVENTOR.
Leo G. Scutt
BY Joseph B. Gardner
his ATTORNEY March 30, 1937.  L. G. SCUTT  2,075,474
ELECTRICAL COOKING AND TOASTING DEVICE
Filed March 11, 1933  2 Sheets-Sheet 2
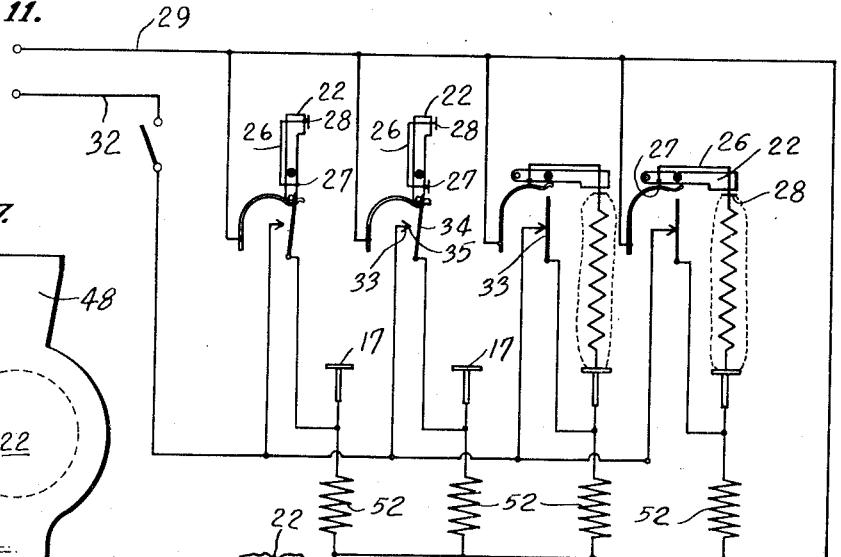
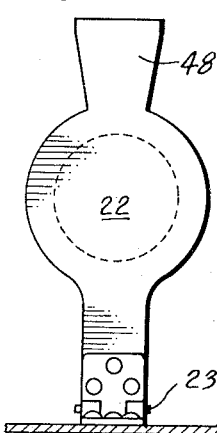
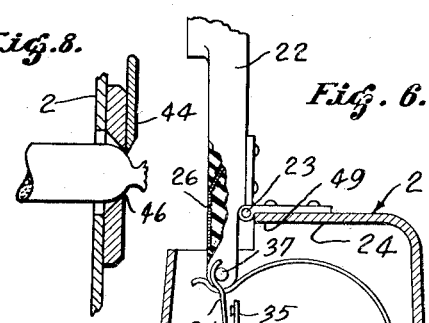
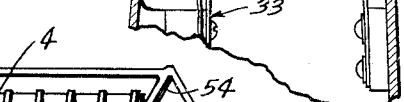
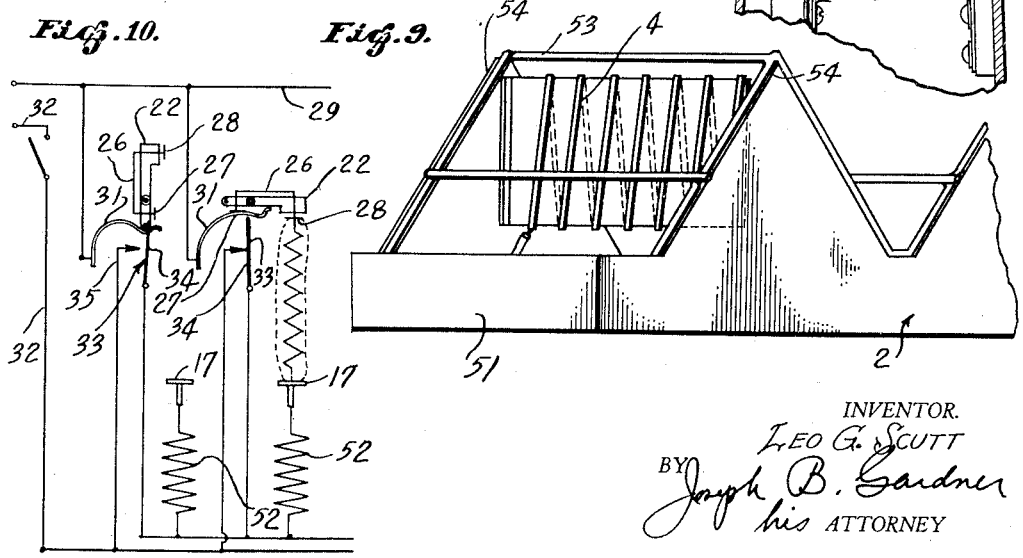
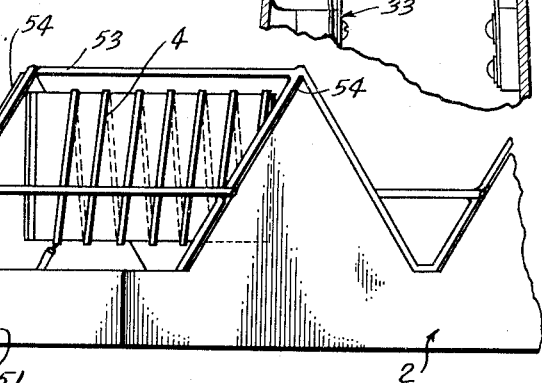
INVENTOR.
LEO G. SCUTT
BY Joseph B. Gardner
his ATTORNEY Patented Mar. 30, 1937

2,075,474

UNITED STATES PATENT OFFICE 2,075,474

ELECTRICAL COOKING AND TOASTING DEVICE

Leo G. Scutt, Oakland, Calif.

Application March 11, 1933, Serial No. 660,360

6 Claims. (Cl. 219—19)

The invention relates to an electrically operated device for cooking and toasting food articles such as frankfurters, buns, and so forth, and relates more particularly to a device of this kind adapted for use in restaurants, food stands, and the like and especially where food is to be cooked in plain view of the customer. Still more particularly the invention relates, in so far as the cooking feature is concerned, to devices wherein the cooking is effected by passing an electric current directly through the food.

An object of the invention is to provide a device of the character described which will permit the attendant to place the food article into proper position for cooking and to withdraw same after the cooking operation is completed without any danger of the attendant receiving any electrical shock.

Another object of the invention is to provide a device of the character described in which there will be eliminated the possibility of the container or enclosure in which the article is cooked being displaced from position, particularly on completion of the cooking operation and during the removal of the article from the device.

A further object of the invention is to provide a device of the character described having a plurality of cooking units each of which has associated therewith a cooperating unit which may be used for toasting purposes and is arranged to be automatically placed in operation or rendered inoperative according to whether or not a cooking operation is taking place in the associated unit.

A still further object of the invention is to provide a device of the character described which may be readily adjusted to accommodate different sizes or lengths of food articles and to exert the proper pressure thereagainst during the cooking operation, in a manner which will avoid any possibility of the food article being accidentally ejected from the device.

The invention possesses other objects and features of advantage, some of which, with the foregoing, will be set forth in the following description of the preferred form of the invention which is illustrated in the drawings accompanying and forming part of the specification. It is to be understood, however, that variations in the showing operation is taking place in the associated may be adopted within the scope of the invention as set forth in the claims.

Referring to said drawings:

Figure 1 is a front elevation of the device of my invention with some of the cooking units in operative position and some in inoperative position.

Figure 2 is an end view of the device as shown in Figure 1.

Figure 3 is a vertical sectional view of the device on a larger scale, and taken on the line III—III of Figure 1.

Figures 4 and 5 are bottom and vertical sectional views of the food container tube and associated portion of the frame of the device.

Figure 6 is a fragmentary sectional view similar to Figure 3, but with the parts shown in non-cooking relation.

Figure 7 is a fragmentary sectional view of the device taken at right angles to Figure 3, the plane of the section being indicated by the line VII—VII of Figure 3.

Figure 8 is a sectional view of the food clipping attachment provided on the device.

Figure 9 is a fragmentary perspective view of the toasting unit incorporated with the device.

Figure 10 is a diagrammatic representation of the electric circuit used in the device.

Figure 11 is a diagrammatic representation of a modified form of electric circuit which may be utilized.

In the drawings I have shown the device of a design adapting the same for use for cooking food articles such as frankfurters and toasting buns and the like, and comprises in the preferred embodiment of the invention a frame 2 having arranged thereon a plurality of frankfurter cooking units 3 and a like number of toasting units 4 associated with the cooking units. The units 3 are located at the rear portion of the frame and each consists as here shown of a vertically-disposed tubular container 6 open at the top and bottom and preferably formed of a special heat resisting glass or other transparent material. As an important feature of the device, the significance of which will be more apparent hereinafter, each tube is designed for removable but secure and firm attachment to the frame, and such attachment may be effected in any suitable manner such as for instance by threaded portions 7 and 8 provided respectively on the base of the tube and on the sides of an opening 9 provided in the frame, for association with each tube. Another simple but effective form of connection between the tubes and frame is illustrated in Figures 4 and 5 where the tube is provided with projections 12 which may be passed through slots 13 at the sides of the openings in the frame whereby upon rotation of the tube the latter may be locked in or released from the frame in the well known manner. In both of the forms illustrated a shoulder 14 is provided on the tube to limit the amount of insertion thereof in the openings and at the same time to afford a firm locking thereof in position in the frame.

Support for the frankfurter in the tube is provided for by a movable member 16 which is arranged to extend into the tube through the opening 9. The member 16 includes a contact piece 17 for the frankfurter and a rod 18 connected therewith and carried in a block 19 which is mounted for vertical displacement in a guide 21. The piece 17 is arranged to provide not only a resting surface for the frankfurter but an electrical contact for one end thereof. An electrical connection for the other or upper end of the frankfurter, as well as a sort of cover for the tube is provided for by means of an arm 22 which is connected to the frame by a hinge 23 whereby it may as shown in Figure 3 extend horizontally with a portion thereof over the tube or as shown in Figure 6 it may lie vertically disposed and entirely disengaged from any operative relationship with the tube or the contents thereof. In the present embodiment the portion of the frame in back of and below the tubes is in the form of an enclosure 24 which houses for the most part the mechanical and electrical parts of the device, and preferably as will be clear from the drawings the inner end portion of the arm is arranged to lie within the enclosure in all the positions of the arm.

Conveniently embedded in the arm, which incidentally is formed of an electric insulating material, is an electrical conductor 26 one end 27 of which lies exposed in the portion of the arm lying within the enclosure 24 while the other end terminates in a contact element 28 exposed adjacent the outer end of the arm and so positioned and formed that it will overlie and substantially cover the entire open area at the top of the tube. When the arm is in a horizontal position or one approaching such a position, electrical connection with a lead wire such as indicated at 29 is established through means of a metal spring member 31 which is so arranged that it will not only remain in contact with the end 27 in the above mentioned positions, but it will serve to resiliently urge the arm to and retain same in both of its extreme positions, that is the full horizontal and the vertical positions. While contact of the member 31 is maintained when the arm is extended over the tube, when the arm is elevated to its vertical position the inner end of the arm will move downwardly and thereby force the end 27 and the member 31 out of contact.

The lead line 32 complementary to the line 29 is in electrical communication with the frankfurter contact member 16 which is suitably insulated from the block 19, and in order that any flow of current will be prevented when the arm 22 is in the inoperative vertical position notwithstanding any connection between the contact 28 and contact 16, a circuit breaker 33 is provided. The latter, as will be clear from Figure 7, is provided with coacting contact elements 34 and 35, the former of which is resiliently held and normally engages the element 35 as is the case when the arm 22 is extended over the tube. When, however, the arm is moved to its elevated position a projection 37 thereof engages the element 34 and moves it out of contact with element 35. It will thus be seen that when the arm is inoperatively disposed, any danger of the attendant making a ground circuit by contact with either the conductor 26 or the member 16 will be entirely avoided.

Means are provided for adjusting the height of the contact and supporting member 16 in each tube so as to adapt the device for frankfurters of various lengths and for partially ejecting the frankfurter from the top of the tube at the completion of the cooking operation. Preferably instead of providing for adjustment of the different members 16 separately, I arrange for adjustment of such members simultaneously or jointly. As here shown there is connected to each block 19 an individual lever 38, and each of such levers is connected in a suitable manner to a common actuating member 39 which extends upwardly through the enclosure of the frame so that a portion thereof will be accessible on the exterior of the device. In order that the support 16 may be held in various adjusted positions, the member 39 is formed with an extension 41 which is resiliently pressed against the wall of the frame and is provided with notches 42, the latter serving when engaged with the frame to lock the member 39 against vertical displacement. To release the member 39 for movement it is merely necessary to retract the notched extension inwardly from engagement with the frame wall.

To effect the cooking of a frankfurter, the arm is held in the elevated inoperative position while the frankfurter is inserted into the tube and caused to rest on the contact 17 of the support 16, the latter having been initially adjusted to a height by the attendant based on the general size or length of frankfurters being handled at the time and with a view to having the upper end of the frankfurter projecting somewhat above the tube when resting on the support 16. With the frankfurter properly positioned in the tube, the arm 22 is swung downwardly toward the tube until the contact element 28 engages the top of the frankfurter. It may be here explained that in order to effect cooking in a uniform manner and in a minimum of time, the ends of the frankfurter are clipped off whereby a better electrical contact is afforded between the elements and the moisture in the frankfurter. A means of clipping the frankfurter ends is conveniently provided on the device and comprises a knife 44 pivoted at one end to the frame and so arranged that the cutting edge thereof may swing across an opening 46 in the frame in which the end of the frankfurter is inserted, as will be clear from Figure 8.

It will be evident that with the arm 22 brought down as aforesaid to operative position, an electrical circuit will be completed through the conductor in the arm and a flow of current through the frankfurter will be established. As will be understood, the relatively high electrical resistance provided by the ingredients in the frankfurter to the passage of the current, causes the frankfurter to become heated very quickly and the moisture therein brought to a boil, and as a result the complete and uniform cooking of the frankfurter will be readily effected.

As soon as the frankfurter is ready, the attendant raises to vertical position the arm 22, which had already been partially raised against the resistance of the spring 31 due to the expansion of the frankfurter on heating, and the frankfurter is ready for withdrawal, the extraction thereof from the top of the tube being usually accomplished with the aid of a fork or the like. A handle portion 48 is preferably provided on the arm 22 to facilitate the gripping thereof by the attendant.

It will be evident since the supporting member 16 is arranged to remain in a fixed position both during the cooking of the frankfurter and the removal thereof from the device, there will be no danger of the frankfurter being ejected from the tube on the sudden removal of the arm from engagement therewith. Likewise since the tube is securely held in position on the frame, there will be no possibility of the tube becoming displaced and damaged during any of the operations on the device or in moving the latter from one position to another. At the same time each tube may be readily removed for and replaced after being washed. It will also be noted that the arm 22 is definitely limited in its downward movement by reason of engagement of the arm with an edge 49 of the frame. By reason of such limitation the arm will be prevented from coming into contact with the tubes, the upper edge of each of which is arranged to lie in spaced relation from the under side of the arm when the latter is in full operatively extended position.

As previously explained there is associated with the frankfurter cooker units a plurality of heating units 4 designed for toasting articles such as buns or the like ordinarily dispensed with the frankfurters. The toasting units are mounted in the frame with the cooker units and positioned forwardly of the tubes in a frame portion 51. As here shown a toaster is associated with each cooker, and the particular toaster associated with a cooker is located directly in front of and aligned with such cooker. Each toaster unit comprises an electric heating element 52 which extends from the front to the rear of the frame portion 51 and is electrically connected directly with the contact portion of member 16 and the circuit breaker 33 as shown in Figure 10 whereby on positioning a frankfurter in the tube and lowering the arm 22 to close the circuit through the frankfurter, the element in the toaster unit will be energized and the latter rendered available for toasting the bun. When the frankfurter is ready and the arm is raised, the flow of current through the heating element in the associated toaster unit will be stopped automatically. Over each heating element of the toaster units is provided a removable guard 53 which in transverse section is in the general form of an inverted V and is supported at the front and rear on corresponding shaped extensions 54 of the frame. A plurality of bars 55 on the guard serve as a shield for the element. In using the units 4 for toasting buns, the latter is slit open along its length and caused to straddle the guard as clearly shown in Figure 1. In this way the interior of the bun will be directly exposed to the heating element and a thorough and quick toasting will result.

In the arrangement illustrated in Figure 11, each of the electrical elements of the toaster is connected in parallel with the branch circuit arranged to be completed by way of the circuit breaker 33. In this way the toaster element may be energized regardless of whether a frankfurter is operatively disposed in the associated cooker unit.

I claim:

1. A device for cooking frankfurters or the like by passing an electric current therethrough, comprising a support, a tubular open ended holder for the frankfurter, an arm pivoted to said support and movable to a position adjacent an end of said holder, an electrical contact member carried by said arm for engagement with one portion of the frankfurter when in said holder, a second electrical contact mounted for longitudinal movement in said holder and arranged for engagement with another portion of said frankfurter and operable to partially eject the frankfurter from the holder on completion of the cooking operation.

2. A device for cooking frankfurters or the like by passing an electric current therethrough, comprising a frame, a tubular open ended holder for the frankfurter, an electric contact arranged for movement to position adjacent one end of the holder for engagement with one end of the frankfurter when in said holder, stop means maintaining said contact when in said position spaced from said holder, and a second electric contact element mounted for longitudinal movement in said holder for engaging the other end of the frankfurter when in the holder.

3. A device for cooking frankfurters or the like by passing an electric current therethrough, comprising a frame, an elongated tubular holder for the frankfurter, an electric contact adapted for movement to and from an end of said holder for engagement with one end of the frankfurter when in the holder and arranged to be energized or de-energized respectively as it is positioned for engagement with or disengagement from the frankfurter as aforesaid, an adjustably positionable electrical contact mounted for longitudinal movement in said holder for engagement with the other end of the frankfurter when in said holder, and means to hold the second contact in any of its adjusted positions.

4. A device for cooking frankfurters or the like by passing an electric current therethrough, comprising a frame, a plurality of cooker units thereon each including an elongated tubular holder for the frankfurter, an individual electric contact for each unit each adapted independent of the other contacts for movement to and from a position of engagement with one end of the frankfurter when in the holder and arranged to be energized or de-energized respectively as it is positioned for engagement with or disengagement from the frankfurter as aforesaid, an adjustably positionable electrical contact mounted for longitudinal movement in each holder and adapted for engagement with the other end of the frankfurter when in the holder and for the partial ejection of the frankfurter from the holder at the completion of the cooking operation, and means for simultaneously moving and fixing the position of each of said second contacts.

5. A device for cooking frankfurters or the like by passing an electric current therethrough, comprising a holder for the frankfurter, a contact arranged for connection with a source of electric current and designed to engage one portion of the frankfurter when in the holder, and a second electrical contact member movable to and from a position for engagement with another portion of the frankfurter when the latter is in the holder and designed to be in or out of communication with the source of current respectively when in or out of position for engagement with the frankfurter as aforesaid, and a spring slidably engaged with said second contact member and formed to resiliently retain the latter in the aforesaid positions engaged with and disengaged from the frankfurter.

6. A device for cooking frankfurters or the like comprising a frame with a housing portion, a holder for the frankfurter carried by said frame, a lever pivoted intermediate its ends to said housing with one arm extending outwardly from the housing and the other arm lying within the housing, an electrical conductor carried by the lever with exposed contact portions on the inner and outer arms, said lever being rotatable for moving the outer arm from an upright to a horizontal position with the contact therein in operative relation to the frankfurter when in the holder, means within the housing resiliently retaining the lever in either of said positions, the contact of the inner arm portion being arranged to be electrically connected with a source of current or disconnected from such source respectively as the outer arm is in horizontal or upright position, a member arranged for electrical communication with the source of current and arranged to engage said last named contact when the arm is in horizontal position, and means on the inner arm for effecting a severing of the electrical connection of said member and said source when the outer arm is in upright position.

LEO G. SCUTT.